(12) United States Patent
Khandelwal et al.

(10) Patent No.: US 7,593,730 B2
(45) Date of Patent: Sep. 22, 2009

(54) SYSTEM SELECTION AND ACQUISITION FOR WWAN AND WLAN SYSTEMS

(75) Inventors: Deepak Khandelwal, San Diego, CA (US); Selvaraj Jaikumar, San Diego, CA (US); Nobuyuki Uchida, San Diego, CA (US); Rotem Cooper, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 543 days.

(21) Appl. No.: 11/217,925

(22) Filed: Aug. 31, 2005

(65) Prior Publication Data

US 2006/0286977 A1    Dec. 21, 2006

Related U.S. Application Data

(60) Provisional application No. 60/691,947, filed on Jun. 17, 2005.

(51) Int. Cl.
*H04W 4/00* (2006.01)
(52) U.S. Cl. .............. 455/435.2; 455/432.1; 455/552.1
(58) Field of Classification Search ......... 455/418–420, 455/422.1, 432.1, 432.3, 435.1–435.3, 436, 455/440, 442, 445, 450, 466, 524, 525, 550.1, 455/551, 552.1, 556.1, 558
See application file for complete search history.

(56) References Cited

U.S. PATENT DOCUMENTS

| | | | | |
|---|---|---|---|---|
| 6,549,771 B2 * | 4/2003 | Chang et al. | ................. | 455/419 |
| 7,139,587 B2 * | 11/2006 | Ishii | ......................... | 455/552.1 |
| 7,218,942 B2 * | 5/2007 | Koo et al. | .................... | 455/464 |
| 7,283,507 B2 * | 10/2007 | Buckley et al. | ............. | 370/338 |
| 7,437,158 B2 * | 10/2008 | Russell | ..................... | 455/435.2 |
| 2002/0193112 A1 * | 12/2002 | Aoki et al. | .................. | 455/437 |
| 2003/0148786 A1 | 8/2003 | Cooper et al. | | |

(Continued)

FOREIGN PATENT DOCUMENTS

| | | | |
|---|---|---|---|
| FR | EP | 1565030 A1 | 8/2005 |
| JP | EP | 1542400 A2 | 6/2005 |
| US | EP | 1241838 A2 | 9/2002 |
| WO | WO | 2004077860 A1 | 9/2004 |
| WO | WO | 2005122601 A2 | 12/2005 |

*Primary Examiner*—Charles N Appiah
*Assistant Examiner*—Anthony S Addy
(74) *Attorney, Agent, or Firm*—Howard H Seo; Kristine W. Elauveme

(57) ABSTRACT

A preferred roaming list (PRL) carries system and acquisition records for wireless wide area network (WWAN) systems and wireless local area network (WLAN) systems. New system and acquisition records may be defined for WLAN. The PRL and system and acquisition records may be defined to be backward compatible with TIA-683-C. System and acquisition information for WLAN systems may be stored in the new system and acquisition records, respectively. Information used to perform encryption and/or authentication for WLAN systems may be stored in a separate WLAN authentication profile table. The system record for each WLAN system indicates a acquisition record and a profile record for that WLAN system. A network identifier table may also carry system records and profile records for WLAN systems. The system records carry information used for WLAN system selection and acquisition. The profile records carry information used to perform encryption and/or authentication for WLAN systems.

42 Claims, 10 Drawing Sheets

U.S. PATENT DOCUMENTS

2004/0236849 A1* 11/2004 Cooper et al. ............... 709/224
2005/0130661 A1  6/2005 Aerrabotu et al.
2005/0227688 A1* 10/2005 Li et al. .................. 455/432.1
2006/0040661 A1*  2/2006 Choi et al. ............... 455/432.3
2006/0234705 A1* 10/2006 Oommen ................. 455/435.3
2007/0117585 A1*  5/2007 Juneja et al. ............. 455/550.1

* cited by examiner

Preferred Roaming List (PRL)
*200*

Acquisition Table *250*

| Index | System Type | Channels /Blocks |
|---|---|---|
| 0 | Cellular CDMA (Standard Channels) | B |
| 1 | Cellular CDMA (Standard Channels) | A |
| 2 | Cellular Analog | A |
| 3 | Cellular Analog | B |
| 4 | PCS CDMA (Using Channels) | 425 |
| 5 | PCS CDMA (Using Blocks) | F |

System Table *210*

GEO L | GEO 3 | GEO 2 | GEO 1

| | System (SID, NID) | Selection Preference | Roaming Indication | Acquisition Index |
|---|---|---|---|---|
| Permitted Systems *220* | SID/NID | First | Off | 0 |
| | SID/NID | Second | On | 1 |
| | SID/NID | Second | On | 2 |
| | SID/NID | Third | Flashing | 4 |
| Forbidden Systems *230* | SID/NID | - | - | - |
| | SID/NID | - | - | - |
| | SID/NID | - | - | - |

*FIG. 2*

SYSTEM SELECTION AND ACQUISITION FOR WWAN AND WLAN SYSTEMS

CLAIM OF PRIORITY UNDER 35 U.S.C. §119

The present Application for Patent claims priority to Provisional Application No. 60/691,947 entitled "Addition of WLAN System information in the PRL (Preferred Roaming List) and user's private WLAN system list to enact" filed Jun. 17, 2005 hereby expressly incorporated by reference herein.

BACKGROUND

I. Field

The present disclosure relates generally to communication, and more specifically to techniques for performing system selection and acquisition by a wireless device.

II. Background

Wireless communication systems are widely deployed to provide various communication services such as voice, packet data, and so on. These wireless systems may be multiple-access systems capable of supporting communication with multiple users by sharing the available system resources. Examples of such multiple-access systems include Code Division Multiple Access (CDMA) systems, Time Division Multiple Access (TDMA) systems, and Frequency Division Multiple Access (FDMA) systems. A CDMA system may implement one or more CDMA standards such as IS-2000 and IS-95 (commonly called "1x-EV-DV", or simply "1x"), IS-856 (commonly called "1x-EV-DO"), and so on, which are known in the art.

A wireless device (e.g., a cellular phone) that supports 1x and/or 1x-EV-DO typically maintains a preferred roaming list (PRL). This PRL contains information to assist the wireless device perform system selection and acquisition in 1x and 1x-EV-DO systems, particularly when the wireless device is roaming. The PRL identifies "permitted" systems that the wireless device should use and (optionally) "forbidden" systems that the wireless device should not use.

The PRL format for 1x is described in a document TIA/ELA/IS-683-A, entitled "Over-the-Air Service Provisioning of Mobile Stations in Spread Spectrum Standards," June 1998, which is publicly available. The PRL format for 1x-EV-DO is described in a document TIA-683-C, entitled "Over-the-Air Service Provisioning of Mobile Stations in Spread Spectrum Standards," March 2003, which is also publicly available. TIA-683-C defines (1) a PRL format that is based on IS-683-A and can convey PRL information for 1x systems and (2) an extended PRL format that can convey PRL information for both 1x and 1xEV-DO systems. TIA-683-C is backward compatible with IS-683-A.

A wireless device that stores an extended PRL is able to select and acquire 1x and 1x-EV-DO systems. However, the wireless device would not be able to select and acquire other systems not covered by TIA-683-C.

SUMMARY

Techniques for performing system selection and acquisition for wireless wide area network (WWAN) systems as well as wireless local area network (WLAN) systems are described herein. The WWAN systems may be 1x systems, 1xEV-DO systems, and/or some other types of systems. The WLAN systems may be IEEE 802.11 systems and/or some other types of systems.

In an aspect, a PRL carries system records and acquisition records for WWAN and WLAN systems. One or more new types of system record and one or more new types of acquisition record may be defined for WLAN. The PRL and new system and acquisition records may be defined to be backward compatible with TIA-683-C. System and acquisition information for WLAN systems may be stored in the new system and acquisition records, respectively, which are included in the PRL. The PRL may be programmed into a wireless device and/or may be sent over the air in the normal manner. Security-related information used to perform encryption and/or authentication for WLAN systems may be stored in a separate WLAN authentication profile table. The system record for each WLAN system may indicate an acquisition record and a profile record applicable for that WLAN system.

In another aspect, a network identifier table stores system records and profile records for WLAN systems and possibly other types of systems. The system records carry information used for system selection and acquisition. The system records in the network identifier table do not need to be backward compatible with TIA-683-C and may be defined to carry pertinent information in an efficient manner. The profile records carry information used to perform encryption and/or authentication for WLAN systems.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 2 shows a PRL having the structure used in IS-683-A and TIA-683-C.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
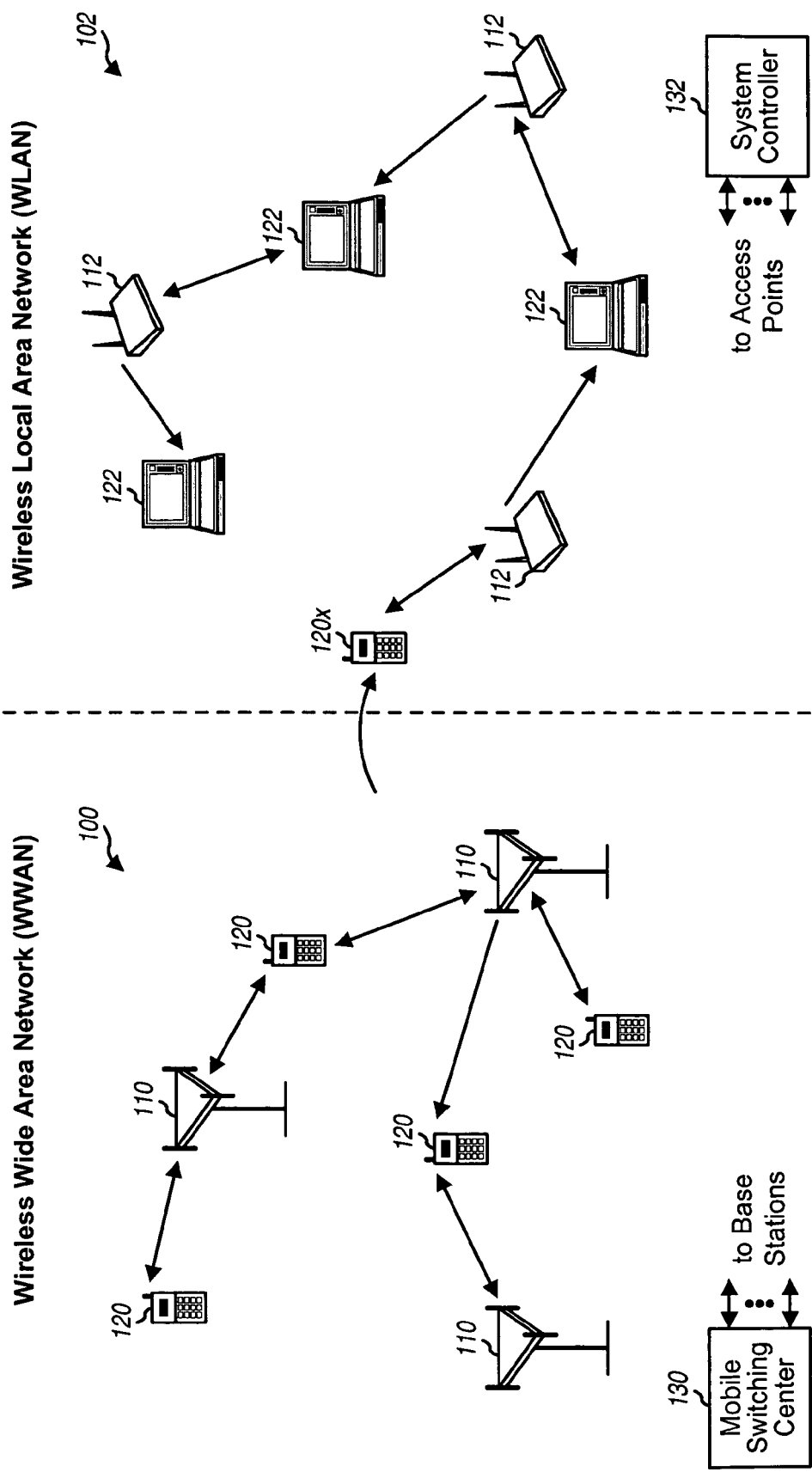
FIG. 1 shows a deployment with WWAN and WLAN systems.

FIG. 1 shows a deployment with a WWAN 100 and a WLAN 102. WWAN 100 provides communication coverage for a large geographic area, e.g., a city, a state, and so on. WLAN 102 provides communication coverage for a smaller geographic area, e.g., a mall, a campus, a store, and so on. The coverage area of WWAN 100 may or may not overlap the coverage area of WLAN 102.

WWAN 100 may be a 1x network, a 1xEV-DO network, or some other type of network. WWAN 100 includes one or more systems, and each system includes one or more smaller networks. Each system within a 1x network is identified by a system identification (SID) value, and each smaller network of each 1x system is identified by a network identification (NID) value. The systems and networks in a 1xEV-DO network are identified using a subnet-ID, which may be up to 128 bits long and follow IPv6 representation format as described in RFC2460, entitled "Internet Protocol, Version 6 (IPv6) Specification," December 1998. The term "network" and "system" are sometimes used interchangeably.

WWAN 100 typically includes many base stations 110 that support communication for wireless devices 120 within the coverage area of the WWAN. For simplicity, only three base stations 110 are shown in FIG. 1 for WWAN 100. A base station is a fixed station that communicates with the wireless devices and may also be called a base transceiver station (BTS) (1x terminology), an access point (1xEV-DO terminology), or some other terminology. Wireless devices 120 are located throughout the coverage areas of WWAN 100. A wireless device may also be called a mobile station (1x terminology), a user/access terminal (1xEV-DO terminology), a user equipment (UE), a mobile equipment (ME), a subscriber unit, or some other terminology. A wireless device may be a cellular phone, a personal digital assistant (PDA), a wireless modem, a handset, and so on. A mobile switching center (MSC) 130 provides coordination and control for base stations 110 in WWAN 100.

WLAN 102 may be an IEEE 802.11 network or some other type of network. WLAN 102 may implement one or more standards such as IEEE Std 802.11a-1999 (commonly called "802.11a"), IEEE Std 802.11b-1999 (commonly called "802.11b"), IEEE Std 802.11g-2003 (commonly called "802.11g"), and so on, which are known in the art. WLAN 102 may include one or more systems, depending on the deployment size of the WLAN. Each system is identified by a service set identifier (SSID) that may be up to 32 bytes long. WLAN 102 includes one or more access points 112 that support communication for wireless terminals 122 (e.g., laptop computers) and wireless devices 120 within the coverage area of the WLAN. For simplicity, only three access points 112 are shown in FIG. 1 for WLAN 102. For a centralized architecture, a system controller 132 provides coordination and control for access points 112 in WLAN 102.

For 1x and 1xEV-DO, a wireless device maintains a preferred roaming list (PRL) for system selection and acquisition. The wireless device may be programmed with the PRL via a serial or USB interface, e.g., during manufacturing or activation. The wireless device may also download the PRL over the air and/or may obtain the PRL from a removable module inserted into the wireless device. The wireless device stores the PRL in a non-volatile memory, which may be in the wireless device or the removable module.

FIG. 2 shows a PRL 200 having the structure used in IS-683-A and TIA-683-C. PRL 200 includes a system table 210 and an acquisition table 250. System table 210 includes a list of permitted and forbidden systems/networks, which is organized by geographic areas (GEOs). For clarity, FIG. 2 shows each geographic area being represented by a respective tabbed table. Each tabbed table includes a section 220 for preferred systems/networks that the wireless device should access and a section 230 for forbidden systems/networks that the wireless device should not access.

The system table and acquisition table have different formats for 1x and 1xEV-DO. FIG. 2 shows the PRL format for 1x. The tabbed table for each geographic area includes (1) one or more records for one or more systems/networks in the geographic area and (2) multiple fields for pertinent information for each record. These fields include a system field, a selection preference field, a roaming indication field, and an acquisition index field. For each record, the system field stores the (SID, NID) pair assigned to the system/network associated with that record. The selection preference field indicates the preference for the associated system/network among all of the permitted systems/networks within the same geographic area. The network operator typically specifies the preference. The roaming indication field specifies how a roaming indicator on the wireless device should be displayed when receiving a signal from the associated system/network. The acquisition index field stores an index value that points to a specific record in acquisition table 250 containing the parameters to use to acquire the associated system/network. Acquisition table 250 includes one record for each unique index value. Each acquisition record includes multiple fields for various parameters used for system acquisition. The acquisition records for different types of system have different formats.

FIG. 2 shows a graphical representation of a PRL for 1x. A PRL for 1xEV-DO has a different format. For both 1x and 1xEV-DO, the PRL information is typically stored as a file.

Figure 3:
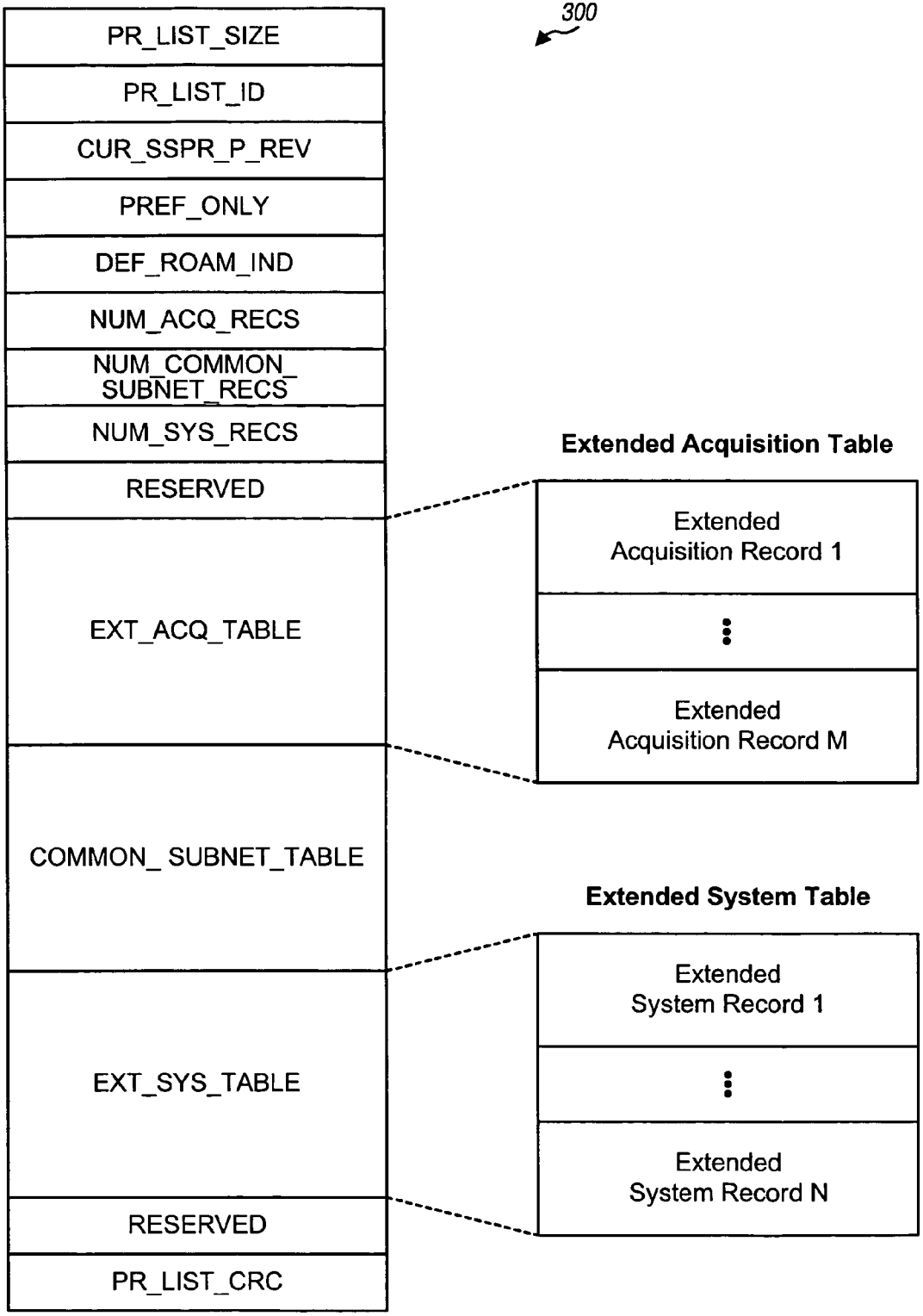
FIG. 3 shows an extended PRL defined by TIA-683-C.

FIG. 3 shows a file 300 containing an extended PRL, which is a PRL in the extended PRL format defined by TIA-683-C. The extended PRL contains a number of fields, all of which are shown in FIG. 3. Table 1 provides a short description for the fields in the extended PRL.

TABLE 1

Extended PRL

| Field | Length (bits) | Description |
| --- | --- | --- |
| PR_LIST_SIZE | 16 | Indicate the total size of the extended PRL in octets. |
| PR_LIST_ID | 16 | Contain the ID assigned to the extended PRL. |
| CUR_SSPR_P_REV | 8 | Indicate the protocol revision of a procedure that determines the parsing rules for the extended PRL. |
| PREF_ONLY | 1 | Indicate whether to operate only in preferred systems. |
| DEF_ROAM_IND | 8 | Indicate a default roaming indication. |
| NUM_ACQ_RECS | 9 | Indicate the number of extended acquisition records in the extended PRL. |
| NUM_COMMON_SUBNET_RECS | 9 | Indicate the number of common subnet records in the extended PRL. |
| NUM_SYS_RECS | 14 | Indicate the number of extended system records in the extended PRL. |
| RESERVED | 7 | Contain padding bits for an integer number of octets. |
| EXT_ACQ_TABLE | variable | Contain the extended acquisition records. |
| COMMON_SUBNET_TABLE | variable | Contain the common subnet records. |

TABLE 1-continued

Extended PRL

| Field | Length (bits) | Description |
| --- | --- | --- |
| EXT_SYS_TABLE | variable | Contain the extended system records. |
| RESERVED | 0 to 7 | Contain padding bits for an integer number of octets. |
| PR_LIST_CRC | 16 | Carry a 16-bit CRC value for the extended PRL. |

Conventionally, the extended PRL contains extended system records, extended acquisition records, and common subnet records for 1x and/or 1xEV-DO systems. A wireless device that stores this extended PRL is only able to select and acquire 1x and 1xEV-DO systems.

In an aspect, an enhanced PRL is defined that can carry extended system records, extended acquisition records, and common subnet records for WLAN and WWAN systems. In an embodiment, the enhanced PRL has the format shown in Table 1, includes all of the fields of the extended PRL, and is backward compatible with TIA-683-C. A wireless device that supports TIA-683-C (which is called a legacy wireless device) is able to extract the records for 1x and 1xEV-DO systems from the enhanced PRL and ignores or discards the records for WLAN systems. A new wireless device that supports the enhanced PRL is able to extract the records for WLAN systems and uses these records for automatic selection and acquisition of the WLAN systems.

TIA-683-C defines two types of extended system record—one type for 1x systems and another type for 1xEV-DO systems. A new type of extended system record may be defined for WLAN systems.

Figure 4A:
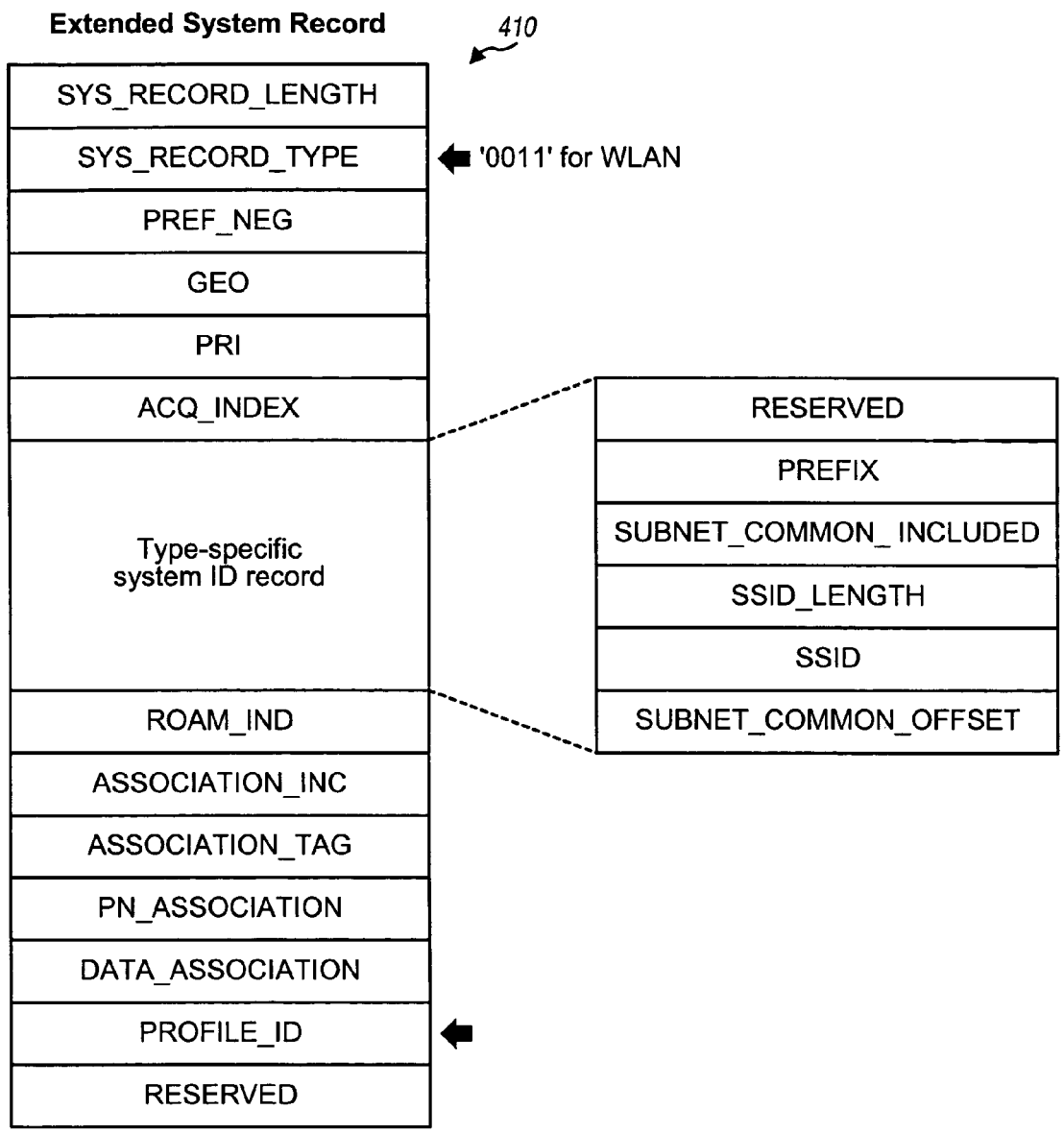
FIG. 4A shows an extended system record for WLAN.

FIG. 4A shows an extended system record 410 for WLAN. Extended system record 410 may be one of the extended system records in the extended system table within the enhanced PRL, as shown in FIG. 3. Extended system record 410 contains (1) all of the fields in the extended system record defined by TIA-683-C and (2) a new PROFILE_ID field.

A WLAN extended system record contains information for an SSID that is assigned to a WLAN system, which may be a group of access points. The SSID is an ASCII string (e.g., "ABC") that may be up to 32 bytes long and is attached to all packets sent in the WLAN system to identify these packets as belonging to that system. The WLAN extended system record may contain the SSID for the WLAN system or may point to a location in the common subnet table where the SSID is stored.

Table 2 lists the fields of WLAN extended system record 410. A short description of each field is given in Table 2, and a more detailed description for some pertinent fields is given below.

TABLE 2

Extended System Record for WLAN

| Field | Length (bits) | Description |
| --- | --- | --- |
| SYS_RECORD_LENGTH | 5 | Indicate the length of the extended system record in octets. |
| SYS_RECORD_TYPE | 4 | Set to '0011' for WLAN extended system record. |
| PREF_NEG | 1 | Indicate if operating on the WLAN system is permitted ('1') or forbidden ('0'). |
| GEO | 1 | Indicate geographical area of the WLAN system. |
| PRI | 1 | Indicate the preference for the WLAN system. |
| ACQ_INDEX | 9 | Point to an extended acquisition record for the WLAN system. |
| Type-specific system ID record: | | |
| RESERVED | 3 | Reserve for future use. |
| PREFIX | 1 | Set to '1' if the record is a prefix for an SSID. |
| SUBNET_COMMON_INCLUDED | 6 | Set to '0' if the SSID is included in the extended system record and to '1' if the SSID is stored in the common subnet table. |
| SSID_LENGTH | 5 | Indicate the length of the SSID in octets. |
| SSID | variable | Contain the SSID for the WLAN system. |
| SUBNET_COMMON_OFFSET | 0 or 13 | Point to the first record in the common subnet table that stores the SSID. |
| ROAM_IND | 0 or 8 | Indicate a roaming indication. |
| ASSOCIATION_INC | 1 | Indicate whether the system record contains the next three fields. |
| ASSOCIATION_TAG | 0 or 8 | Contain an association tag. |
| PN_ASSOCIATION | 0 or 1 | Identify systems with the same PN assignment. |
| DATA_ASSOCIATION | 0 or 1 | Identify systems with the same IP gateways. |
| PROFILE_ID | 8 | Point to an authentication profile for the WLAN system. |
| RESERVED | variable | Contain padding bits. |

The type-specific system ID record for WLAN extended system record 410 includes various fields that are pertinent for WLAN. A PREFIX field is set to '1' if the record is serving as a prefix for an SSID. A WLAN deployment may have many systems that may be assigned similar SSIDs, e.g., "ABC1", "ABC2", "ABC3", and so on. If the PREFIX field is set to '1' and the SSID field is set to "ABC", then a wireless device can acquire any WLAN system with an SSID prefix of "ABC", e.g., "ABC1", "ABC2", or "ABC3". A SUBNET_COMMON_INCLUDED field indicates whether the SSID is stored in the WLAN extended system record or the common subnet table. If SUBNET_COMMON_INCLUDED='0', then the SSID is stored in the SSID field, and the SUBNET_COMMON_OFFSET is omitted. Conversely, if SUBNET_COMMON_INCLUDED='1', then the SSID field is omitted, and the SSID is stored in the common subnet table at the location indicated by the SUBNET_COMMON_OFFSET field. Each common subnet record can store 15 bytes (or octets). Thus, the first 15 bytes of the SSID are stored in the common subnet record indicated by the SUBNET_COMMON_OFFSET field, the next 15 bytes of the SSID (if any) are stored in the next common subnet record, and the last two bytes of the SSID (if any) are stored in the following common subnet record. The SUBNET_COMMON_OFFSET field is zero for the first common subnet record in the common subnet table. The SSID_LENGTH field indicates the length of the SSID (in octets). The SSID_LENGTH field is set to 0 to indicate a wildcard SSID, which means that a WLAN system with any SSID may be acquired.

Multiple WWAN and/or WLAN systems within a given geographic area may be associated together and assigned an association tag that is unique for that geographic area. For example, 1x systems, 1xEV-DO, and/or WLAN systems within the same geographic area may be associated together. A wireless device may attempt to acquire a 1x system when first powered on, then identify WLAN systems associated with the acquired 1x system, and then attempt to acquire an associated WLAN system. The association allows the wireless device to more quickly acquire WLAN systems based on 1x systems.

The PROFILE_ID field points to an authentication profile associated with the WLAN extended system record. For WLAN, the authentication profile contains security-related information as described below. For 1x and 1xEV-DO, the authentication profile may contain information such as the particular Network Access Identifier (NAI) and the particular Point-to-Point Protocol/Authentication, Authorization and Accounting (PPP/AAA) authentication and secrets to use as specified in simple IP or mobile IP profiles per TIA-683-C. A legacy wireless device would terminate the processing of the extended system record after the DATA_ASSOCIATION field and would skip the PROFILE_ID field. A new wireless device would continue to process the PROFILE_ID field. Alternatively, the PROFILE_ID field may be included in the type-specific system ID record.

TIA-683-C defines 12 types of extended acquisition record. Two new types of extended acquisition record may be defined for WLAN—one new type for WLAN system acquisition (using channels) record and another new type for generic WLAN system acquisition record.

Figure 4B:
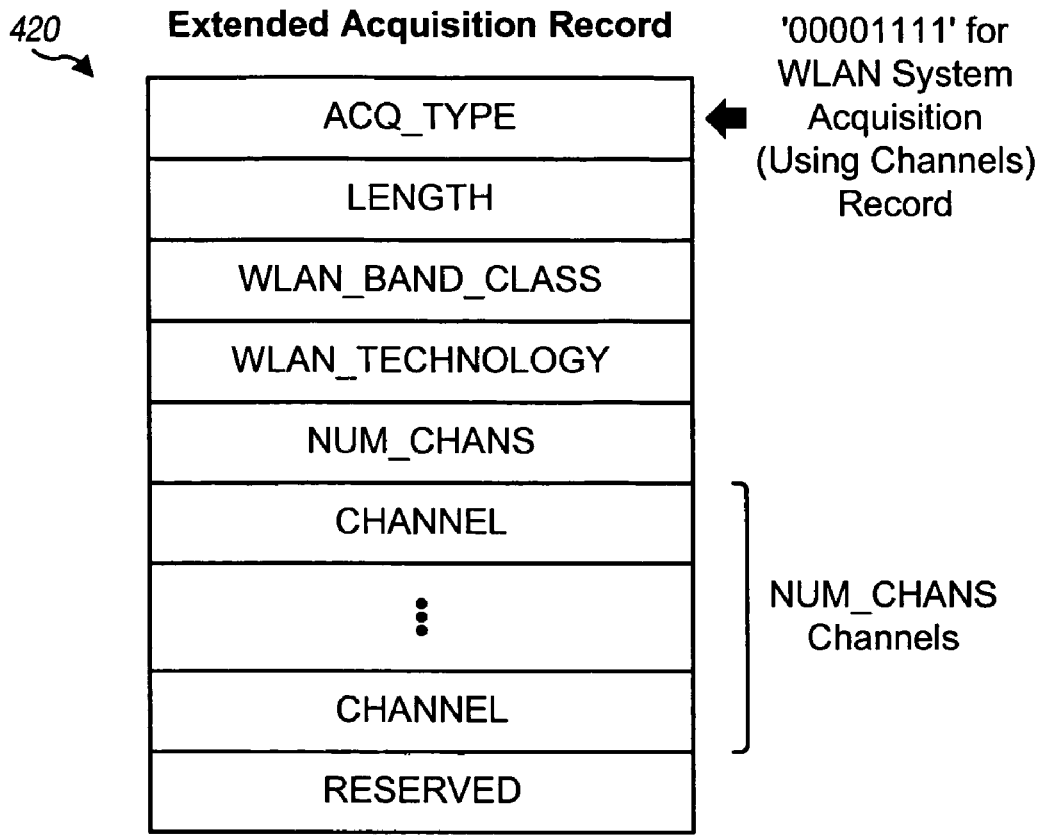
FIGS. 4B and 4C show two extended acquisition records for WLAN.

FIG. 4B shows a WLAN system acquisition (using channels) record 420. Acquisition record 420 may be one of the extended acquisition records in the extended acquisition table within the enhanced PRL, as shown in FIG. 3. Acquisition record 420 may be used to acquire a WLAN system using specific channels.

Table 3 provides a short description for the fields of acquisition record 420, which may include one or more occurrences of the CHAN field. Each CHAN field indicates a specific channel for the WLAN system. Each channel corresponds to a specific frequency within a given frequency band. For example, IEEE 802.11 defines 14 channels at 14 different frequencies for the 2.4 GHz band. The NUM_CHANS and CHAN fields are 5 bits and 11 bits, respectively, in length, which match the length of the NUM_CHANS and CHAN fields used in TIA-683-C. The other fields of acquisition record 420 are described below.

TABLE 3

WLAN System Acquisition (Using Channels) Record

| Field | Length (bits) | Description |
|---|---|---|
| ACQ_TYPE | 8 | Set to '00001111' for WLAN system acquisition (using channels) record. |
| LENGTH | 8 | Indicate the length of the record in octets. |
| WLAN_BAND_CLASS | 8 | Indicate the band class of the WLAN system. |
| WLAN_TECHNOLOGY | 8 | Indicate the technology of the WLAN system. |
| NUM_CHANS | 5 | Indicate the number of channels in the record. |
| NUM_CHANS occurrences of the following field: | | |
| CHAN | 11 | Indicate the channel. |
| RESERVED | variable | Contain padding bits. |

Figure 4C:
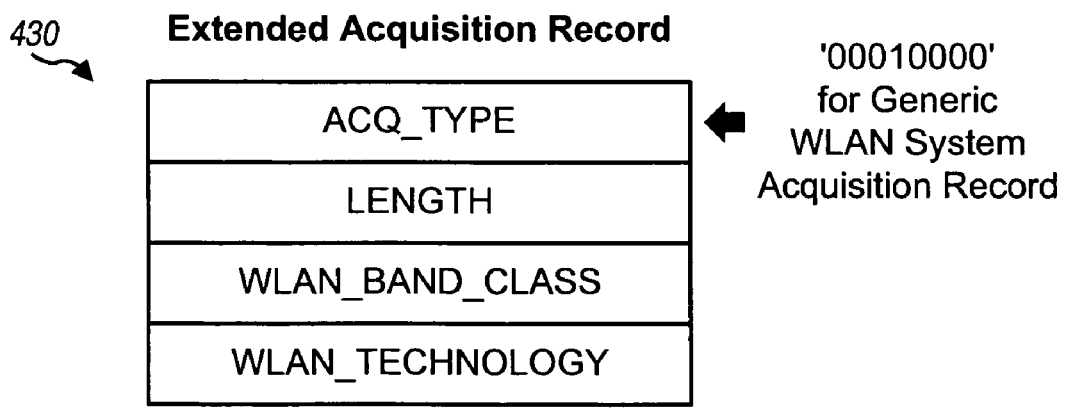

FIG. 4C shows a generic WLAN system acquisition record 430. Acquisition record 430 may be one of the extended acquisition records in the extended acquisition table within the enhanced PRL, as shown in FIG. 3. Acquisition record 430 may be used to acquire a WLAN system using a specific WLAN frequency band as specified by regulatory bodies. Table 4 provides a short description for the fields of acquisition record 430.

TABLE 4

Generic WLAN System Acquisition Record

| Field | Length (bits) | Description |
|---|---|---|
| ACQ_TYPE | 8 | Set to '00010000' for generic WLAN system acquisition record. |
| LENGTH | 8 | Indicate the length of the record in octets. |
| WLAN_BAND_CLASS | 8 | Indicate the band class of the WLAN system. |
| WLAN_TECHNOLOGY | 8 | Indicate the technology of the WLAN system. |

Table 5 lists an exemplary set of frequency band types for the WLAN_BAND_CLASS field. Each frequency band type is associated with certain specifications (e.g., for transmit power) defined by a particular regulatory body for a particular frequency band. A wireless device operates in accordance with the specifications associated with the frequency band type indicated by the WLAN_BAND_CLASS field of the extended acquisition record. Table 5 also lists an exemplary set of technology types, where A, B and G refer to 802.11a, 802.11b and 802.11g, respectively. A wireless device operates in accordance with the technology indicated in the WLAN_TECHNOLOGY field of the extended acquisition record.

TABLE 5

| WLAN_BAND_CLASS | | WLAN_TECHNOLOGY | |
|---|---|---|---|
| Frequency Band Type | Value | Technology Type | Value |
| 802.11_2400 MHZ_US | 00000000 | A | 00000000 |
| 802.11_2400 MHZ_EUROPE | 00000001 | B | 00000001 |
| 802.11_2400 MHZ_FRANCE | 00000010 | G Only | 00000010 |
| 802.11_2400 MHZ_SPAIN | 00000011 | G | 00000011 |
| 802.11_2400 MHZ_JAPAN | 00000100 | Any | 11111111 |
| 802.11_5000 MHZ_US | 00000101 | RESERVED | other values |
| 802.11_5000 MHZ_EUROPE | 00000110 | | |
| 802.11_5000 MHZ_FRANCE | 00000111 | | |
| 802.11_5000 MHZ_SPAIN | 00001000 | | |
| 802.11_5000 MHZ_JAPAN | 00001001 | | |
| ANY BAND CLASS | 00011111 | | |
| RESERVED | other values | | |

FIGS. 3 through 4C and Tables 1 through 5 show specific embodiments of a PRL and system and acquisition records that support system selection and acquisition for WLAN systems. In general, the PRL and system and acquisition records may include any number of fields for any type of information that may be used for selection and acquisition of WLAN systems.

Figure 5:
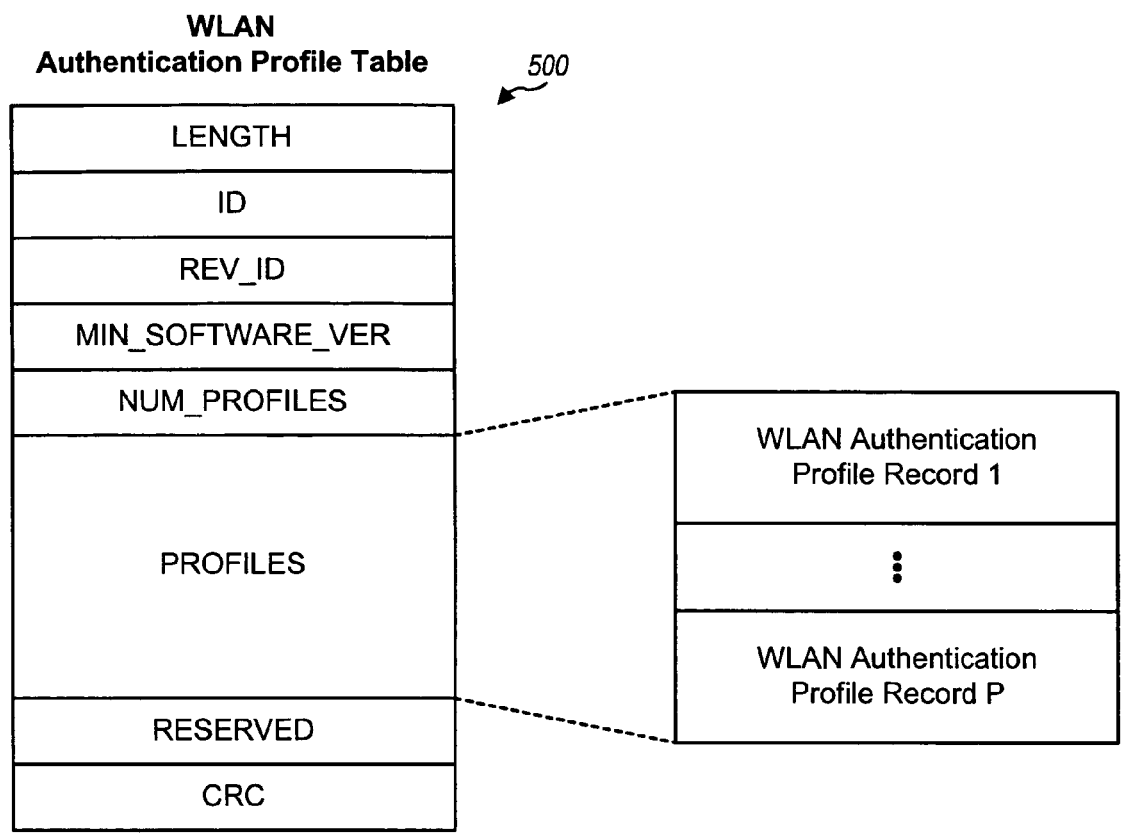
FIG. 5 shows an authentication profile table for WLAN.

FIG. 5 shows a WLAN authentication profile table 500 that stores WLAN authentication profiles. Table 6 provides a short description for the fields of profile table 500.

TABLE 6

WLAN Authentication Profile Table

| Field | Length (bits) | Description |
|---|---|---|
| LENGTH | 16 | Indicate the length of the profile table in octets. |
| ID | 16 | Contain a unique ID assigned to the profile table. |
| REV_ID | 8 | Indicate version number of the profile table. |
| MIN_SOFTWARE_VER | 8 | Indicate minimum version of the software that can interpret the profile table. |
| NUM_PROFILES | 8 | Indicate the number of profiles in the profile table. |
| PROFILES | variable | Contain the profiles. |
| RESERVED | variable | Reserve for future use. |
| CRC | 16 | Carry a 16-bit CRC value for the profile table. |

A WLAN authentication profile defines the encryption and/or authentication (if any) to use for a WLAN system. The WLAN authentication profile contains security-related information such as the type of encryption to use (if any), the type of authentication to use (if any), and pertinent authentication and encryption parameters.

Table 7 lists an embodiment of the possible fields of a WLAN authentication profile. The PROFILE_ID field contains a profile ID value for the WLAN authentication profile. A profile ID value of 0 may be assigned to a default WLAN authentication profile that may be used for (1) WLAN systems that are not listed in the PRL and/or (2) WLANs that are listed in the PRL but without WLAN authentication profiles. A MOBILE_IP_PROFILE_ID field indicates a mobile IP profile to use with the WLAN authentication profile. The mobile IP profile stores authentication information for mobile IP. A hexadecimal value of 0xFF for the MOBILE_IP_PROFILE_ID field may indicate use of the active mobile IP profile (if present). The other fields of the WLAN authentication profile are described below.

TABLE 7

Fields for WLAN Authentication Profile

| Field | Length (bits) | Description |
|---|---|---|
| LENGTH | 8 | Indicate the length of the profile in octets. |
| PROFILE_ID | 8 | Contain a profile ID value for the profile. |
| PROFILE_TYPE | 8 | Indicate the profile type. Set to '1' for WLAN. |
| ENCRYPTION_TYPE | 8 | Indicate the encryption type. |
| AUTHENTICATION_TYPE | 8 | Indicate the authentication type. |
| MOBILE_IP_PROFILE_ID | 8 | Point to a mobile IP profile to use with this WLAN authorization profile. |
| Authentication type-specific fields: | | |
| DEFAULT_WEP_KEY_ID | 8 | Indicate a default key for WEP. |
| WEP_KEY_ID1 | variable | Contain the first WEP encryption key. |
| WEP_KEY_ID2 | variable | Contain the second WEP encryption key. |
| WEP_KEY_ID3 | variable | Contain the third WEP encryption key. |
| WEP_KEY_ID4 | variable | Contain the fourth WEP encryption key. |

TABLE 7-continued

Fields for WLAN Authentication Profile

| Field | Length (bits) | Description |
|---|---|---|
| 802.1X_ID_LEN | 8 | Indicate the size of an 802.1X ID. |
| 802.1X_ID | variable | Contain the 802.1X ID. |
| 802.1X_PASSWORD_LEN | 8 | Indicate the size of an 802.1X password. |
| 802.1X_PASSWORD | variable | Contain the 802.1X password. |
| CERTIFICATE_ID | 8 | Point to a certificate in a certificate table. |
| RESERVED | variable | Reserve for future use. |

Various encryption and authentication schemes may be used for WLAN. For encryption, Wired Equivalent Privacy (WEP) with key sizes of 40 and 104 bits, Temporal Key Integrity Protocol (TKIP), Advanced Encryption Standard (AES), some other encryption, or no encryption may be used for WLAN. For authentication, WEP-based authentication, Extensible Authentication Protocol (EAP), Wi-Fi Protected Access (WPA), some other authentication, or no authentication may be used for WLAN. EAP includes a number of different implementations such as EAP-TLS (Transport Layer Security) and EAP-MD5 (Message-Digest algorithm 5). EAP-TLS utilizes secure communication with a RADIUS authentication server. These various encryption and authentication schemes are known in the art. Authentication for WLAN in 3GPP2 is described in a document 3GPP2 X.S0028, entitled "Wireless Local Area Network (WLAN) Interworking," which is publicly available.

Table 8 lists an exemplary set of encryption types and an exemplary set of authentication types that may be supported for WLAN. A wireless device performs encryption in accordance with the encryption scheme (if any) indicated in the ENCRYPTION_TYPE field and further performs authentication in accordance with the authentication scheme (if any) indicated in the AUTHENTICATION_TYPE field. The use of WEP authentication implies that WEP encryption is enabled. 802.1X_TLS denotes IEEE 802.1X/EAP with TLS, 802.1X_MD5 denotes IEEE 802.1X/EAP with MD5, and WKEY denotes WLAN long term key (which is described in 3GPP2 X.S0028). Authentication "with RADIUS" means that authentication is performed via a RADIUS server. Authentication "with Certificate ID" means that authentication is performed with a cryptographic certificate obtained from a secured certificate authority.

TABLE 8

| ENCRYPTION_TYPE | Value | AUTHENTICATION_TYPE | Value |
|---|---|---|---|
| No Encryption | 0 | No Authentication | 0 |
| 64-bit WEP (40-bit key) | 1 | WEP Authentication | 1 |
| 128-bit WEP (104-bit key) | 2 | 802.1X Password Based | 2 |
| TKIP | 3 | 802.1X_TLS with RADIUS | 3 |
| AES | 4 | 802.1X_MD5 with RADIUS | 4 |
| | | 802.1X_TLS with RADIUS with WKEY configured | 5 |
| | | 802.1X_TLS with Certificate ID | 6 |

Each authentication type may be associated with a specific set of fields for pertinent parameters. Table 9 lists the fields for each authentication type given in Table 8. For each authentication type, an 'x' for a given authentication type-specific field means that the field is included in a WLAN authentication profile for that authentication type.

TABLE 9

Authentication Type-Specific Fields for WLAN

| Authentication Type-Specific Field | AUTHENTICATION_TYPE | | | | | |
|---|---|---|---|---|---|---|
| | 1 | 2 | 3 | 4 | 5 | 6 |
| DEFAULT_WEP_KEY_ID | x | | | | | |
| WEP_KEY_ID1 | x | | | | | |
| WEP_KEY_ID2 | x | | | | | |
| WEP_KEY_ID3 | x | | | | | |
| WEP_KEY_ID4 | x | | | | | |
| 802.1X_ID_LEN | | | x | x | x | x |
| 802.1X_ID | | | x | x | x | x |
| 802.1X_PASSWORD_LEN | | x | | x | | |
| 802.1X_PASSWORD | | x | | x | | |
| CERTIFICATE_ID | | | | | | x |

Figures 6A, 6B:
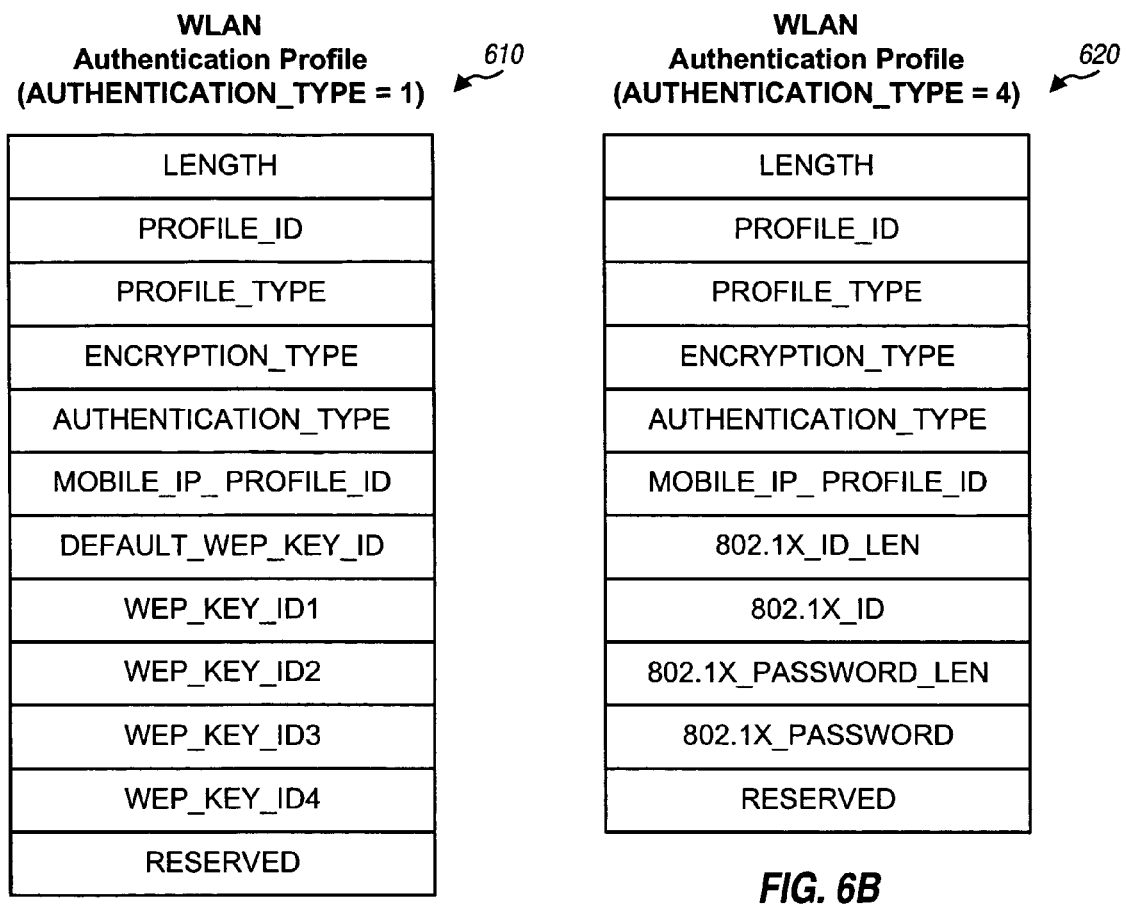
FIGS. 6A and 6B show two authentication profiles for WLAN.

FIG. 6A shows a WLAN authentication profile 610 for WEP authentication (AUTHENTICATION_TYPE=1). For authentication profile 610, the WEP_KEY_ID1 through WEP_KEY_ID4 fields contain four security keys used for WEP. The DEFAULT_WEP_KEY_ID field indicates which one of the four WEP security keys is the default key. The size of each of the four WEP key fields is 5 octets for 64-bit WEP and 13 octets for 128-bit WEP. For each WEP key field, key[0] contains the least significant byte of a WEP key, and the least significant bit of key[0] contains the least significant bit of the WEP key.

FIG. 6B shows a WLAN authentication profile 620 for 802.1X authentication based on MD5 with RADIUS (AUTHENTICATION_TYPE=4). For authentication profile 620, the 802.1X_ID_LEN field indicates the size of an 802.1X ID field, which may be up to 72 bytes long. The 802.1X_ID field contains an ID used for RADIUS-based procedures, which is typically of the form user@realm. The 802.1X_PASSWORD_LEN field indicates the size of an 802.1X password field, which may be up to 31 bytes long. The 802.1X_PASSWORD field stores an MD-5 shared secret for RADIUS-based 802.1X authentication.

The WLAN authentication profiles for the other authentication types may be formed based on Tables 7 and 9. For AUTHENTICATION_TYPE=2, the 802.1X_PASSWORD field stores an 802.1X password for WPA in a home/small office environment where RADIUS is not used for authentication. This password is used to kick start a TKIP encryption program.

FIGS. 5, 6A and 6B and Tables 7, 8 and 9 show a specific embodiment of a WLAN authentication profile table and different WLAN authentication profiles. In general, the profile table and profiles may include any number of fields for any type of information that may be used for encryption, authentication, and/or other purposes. For example, other types of encryption and authentication may be supported, and different fields may be formed in the profile for different parameters used by these other types of encryption and authentication.

For the embodiments described above, an extended PRL contains extended system records and extended acquisition records for WWAN and WLAN systems, and a WLAN authentication profile table contains WLAN authentication profiles for the WLAN systems. The extended PRL is typically generated by a network operator to achieve the desired system usage, e.g., to direct wireless devices to systems operated by the network operator and/or to systems for which the network operator has a cross license. The WLAN authentication profile table contains security-related information used for encryption and authentication and may be stored in a file that is separate from the file for the extended PRL.

An extended PRL may be associated with a specific WLAN authentication profile table. This is because the PROFILE_ID field in the extended system records within the extended PRL points to specific profile records within the WLAN authentication profile table. A network operator may generate different sets of extended PRL and WLAN authentication profile table, e.g., for different service plans. Each wireless device may then store one set of extended PRL and WLAN authentication profile table for the subscribed service plan.

In the embodiments described above, the information used for WLAN system selection and acquisition is stored in a format that is backward compatible with TIA-683-C. The information used for WLAN system selection and acquisition may be more efficiently stored in a file that does not need to be backward compatible with TIA-683-C.

Figure 7:
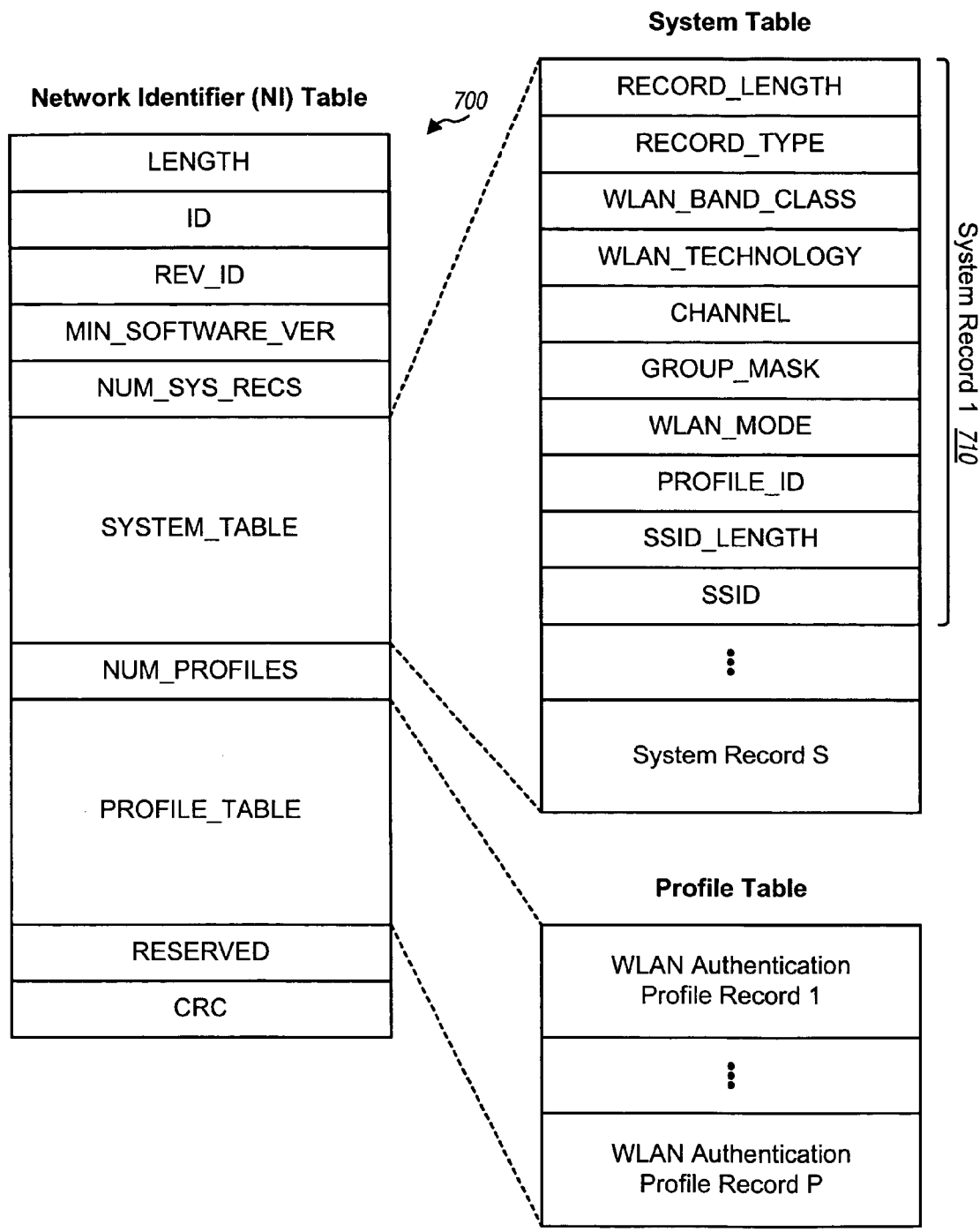
FIG. 7 shows a network identifier table for WLAN.

FIG. 7 shows a network identifier (NI) table 700 that contains information for selecting and acquiring WLAN systems. Network identifier table 700 may be created by a wireless user, an administrator for a WLAN, a network operator for a WWAN, and/or some other entity. Network identifier table 700 may be customized for each wireless device and may be modified as desired or necessary. For example, the wireless user may specify each SSID and its associated parameter and may store the SSID in the network identifier table. Table 10 provides a short description for the fields of network identifier table 700.

TABLE 10

Network Identifier Table

| Field | Length (bits) | Description |
| --- | --- | --- |
| LENGTH | 16 | Indicate the length of the NI table in octets. |
| ID | 16 | Contain a unique ID assigned to the NI table. |
| REV_ID | 8 | Indicate version number of the NI table. |
| MIN_SOFTWARE_VER | 8 | Indicate minimum version of the software that can interpret the NI table. |
| NUM_SYS_RECS | 16 | Indicate the number of system records in the system table. |
| SYSTEM_TABLE | variable | Contain the system records. |
| NUM_PROFILES | 16 | Indicate the number of profiles in the profile table. |
| PROFILE_TABLE | variable | Contain the profiles. |
| RESERVED | variable | Reserve for future use. |

The first system record in the system table, system record 0, may be used to store WLAN system information entered by the user. Whenever the user manually enters system information, this information is initially stored in system record 0. If the user wants to permanently save the system information, then the information is stored as another system record in the system table.

The first profile in the profile table, with a Profile ID value of 0, may be used to store profile information manually entered by the user. If the user wants to permanently save the profile information, then the information is stored as another profile in the profile table. The PROFILE_ID field of each system record using this profile is updated accordingly.

FIG. 7 also shows a system record 710 in the system table within network identifier table 700. Table 11 provides a short description for the fields of system record 710.

TABLE 11

System Record for Network Identifier Table

| Field | Length (bits) | Description |
| --- | --- | --- |
| RECORD_LENGTH | 8 | Indicate the length of the record in 4-octet units. |
| RECORD_TYPE | 8 | Indicate the record type. Set to '1' for WLAN. |
| WLAN_BAND_CLASS | 8 | Indicate the band class of the WLAN system. |
| WLAN_TECHNOLOGY | 8 | Indicate the technology of the WLAN system. |
| CHANNEL | 16 | Indicate the channel. |
| GROUP_MASK | 16 | Used to arrange system records into groups. |
| WLAN_MODE | 8 | Indicate the WLAN mode: 0x01 = AD-HOC, 0x02 = INFRA, 0x03 = any. |
| PROFILE_ID | 8 | Indicate the profile associated with the system record and stored in the profile table. |
| SSID_LENGTH | 8 | Indicate the length of the SSID. |
| SSID | variable | Contain the SSID specified by the user. |

The WLAN_BAND_CLASS field indicates the band class of the WLAN system and may be encoded as shown in Table 5. The WLAN_TECHNOLOGY field indicates the technology of the WLAN system and may also be encoded as shown in Table 5. Alternatively, 802.11a, 802.11b and 802.11g may be associated with bits 0, 1 and 2, respectively, of the WLAN_TECHNOLOGY field, and each bit may be set to '1' to indicate support for that technology. For example, a hexadecimal value of 0x01 indicates support for 802.11a, a value of 0x02 indicates support for 802.11b, a value of 0x4 indicates support for 802.11g, a value of 0x06 indicates support for 802.11b and 802.11g, and a value of 0x07 indicates support for 802.11a, 802.11b and 802.11g.

The CHANNEL field indicates the channel and may be from 1 through 14 for 802.11b/g. A channel of 0 may mean any channel. Each bit in the GROUP_MASK field may represent a different group. A system record may be associated with any given group by setting the bit for that group to '1'.

For the embodiment shown in Table 11, a wireless device can obtain service from any WLAN system that matches the SSID, WLAN_MODE, and GROUP_MASK fields of a system record in the network identifier table. For this embodiment, there is no preference among WLAN systems within the same geographic area. In other embodiments, the system record may include other fields used to indicate preference.

Different types of system records may be defined for different technologies (e.g., 802.11, 1x, 1xEV-DO, and so on) and included in network identifier table 700. Different system record types may be associated with different technology-specific fields. This allows network identifier table 700 to store system records for WLAN systems as well as other systems utilizing other technologies.

FIGS. 3 through 7 and Tables 1 through 11 show specific embodiments of an extended PRL and a network identifier file that can store information used to perform system selection, acquisition, encryption, and authentication for WLAN systems. In general, the information may be stored (1) in any number of tables, any number of records, and any number of fields and (2) using any format for the tables, records, and fields. The system and acquisition information may be stored in separate system and acquisition records (as shown in FIG. 3) or in the system record (as shown in FIG. 7). The information for encryption and authentication may be stored in separate profile records (as shown in FIG. 7) or may be combined with the system records (not shown in any of the figures).

Figure 8:
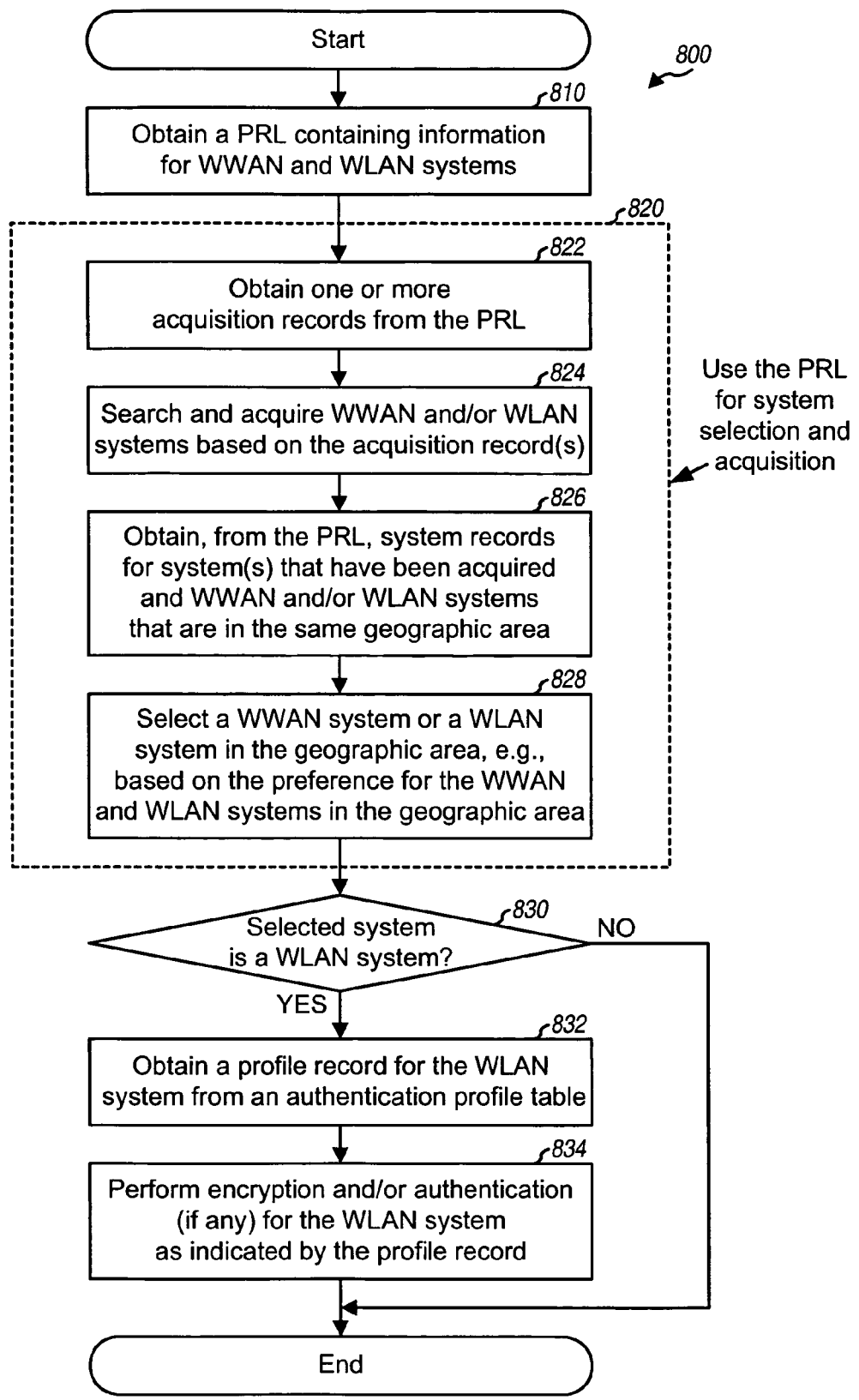
FIG. 8 shows a process for performing system selection and acquisition.

FIG. 8 shows an embodiment of a process 800 performed by a wireless device for system selection and acquisition. Initially, a PRL containing information for WWAN and WLAN systems is obtained, e.g., from a non-volatile memory (block 810). The PRL is used for system selection and acquisition (block 820). For the embodiment shown in FIG. 8 for block 820, one or more acquisition records are obtained from the PRL (block 822). WWAN and/or WLAN systems are searched and acquired based on the acquisition record(s) (block 824). Acquisition may be attempted with one acquisition record at a time, and the acquisition records in the PRL may be selected in a predetermined (e.g., sequential) order. A WLAN system may be acquired, e.g., based on the technology, band class, and/or channel indicated in the acquisition record. After acquiring at least one system, system records for the system(s) that have been acquired as well as WWAN and/or WLAN systems that are in the same geographic area are obtained from the PRL (block 826). A WWAN system or a WLAN system in the geographic area is selected, e.g., based on the preference for the WWAN and WLAN systems in the geographic area (block 828). This preference may be indicated by the PRI field, the PREFIX field, and/or other fields in the system records, as shown in Table 2 and FIG. 4A. If the selected system has not been acquired, then acquisition of the selected system is performed based on its acquisition record. The system selection and acquisition may be performed iteratively such that service is obtained from the most preferred system that can be acquired.

In another embodiment, a 1x system is initially searched and acquired based on acquisition records for 1x systems in the PRL. If a 1x system is acquired, then WLAN systems associated with this 1x system is determined based on the system records in the PRL. Acquisition may thereafter be attempted on one or more of these WLAN systems. System selection and acquisition may also be performed in other manners.

If the selected system is a WLAN system, as determined in block 830, then a profile record for the WLAN system is obtained from a WLAN authentication profile table (block 832). Encryption and/or authentication may be performed for the WLAN system as indicated by the profile record (block 834). For example, the profile record may indicate which encryption scheme (if any) to use and which authentication scheme (if any) to use and may further contain pertinent information for the encryption and/or authentication schemes. Encryption would then be performed for the WLAN system in accordance with the encryption scheme and further based on the associated information in the profile record. Similarly, authentication may be performed with the WLAN system in accordance with the authentication scheme and further based on the associated information in the profile record.

System selection and acquisition for WLAN systems may also be performed based on the network identifier table shown in FIG. 7 and Table 10. System selection may be performed in a different manner with the network identifier table than with the PRL. For example, WLAN systems may be selected based on technology, band class, channel, WLAN mode, and/or other criteria when using the network identifier table. The information in the network identifier table may be used for system selection, acquisition, encryption (if any), and authentication (if any).

Figure 9:
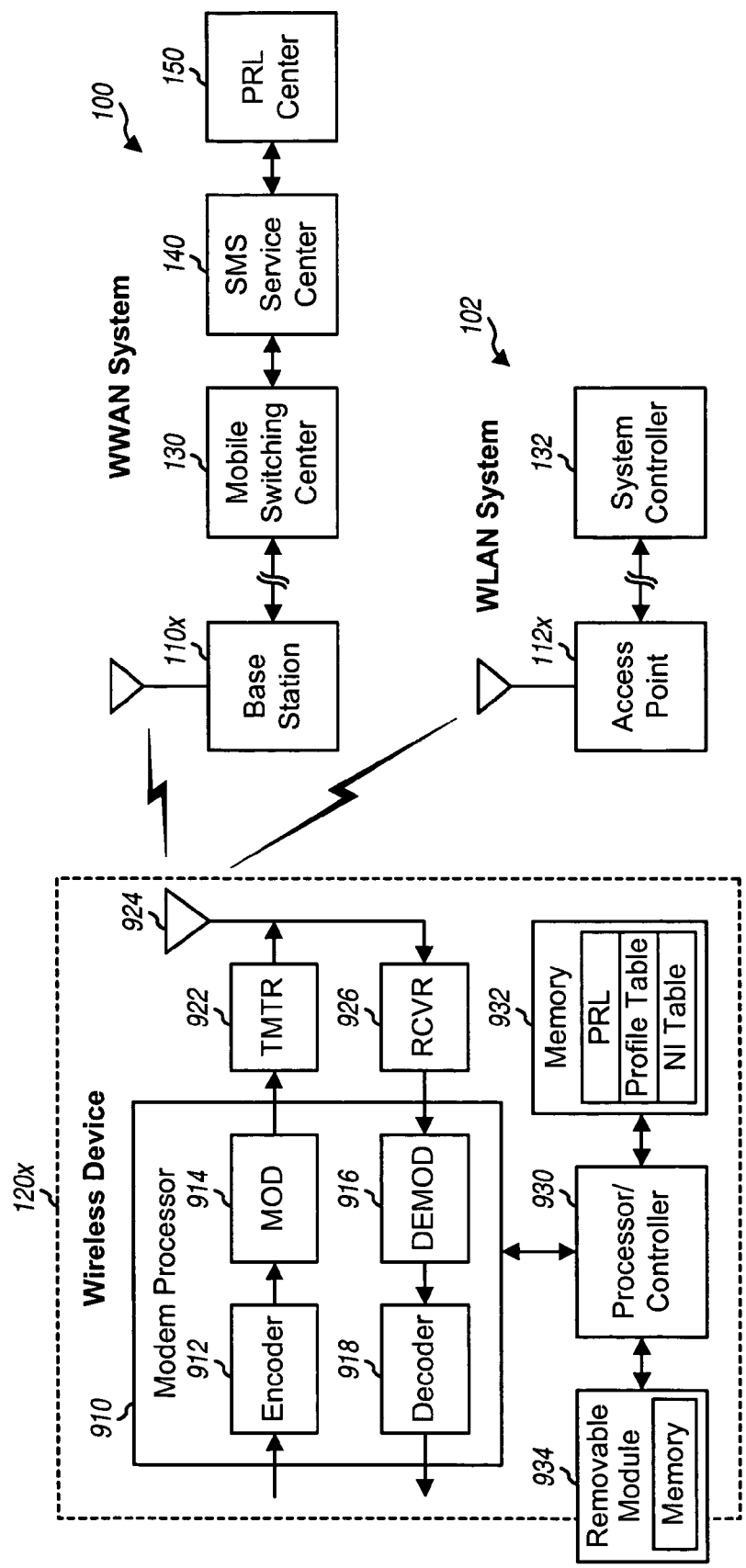
FIG. 9 shows a block diagram of a wireless device.

FIG. 9 shows a block diagram of wireless device 120x. On the transmit path, traffic data and signaling to be sent by wireless device 120x are processed (e.g., formatted, encoded, and interleaved) by an encoder 912 and further processed (e.g., modulated, spread, channelized, and scrambled) by a modulator (MOD) 914 to obtain a stream of data chips. A transmitter unit (TMTR) 922 then conditions (e.g., converts to analog, filters, amplifies, and frequency upconverts) the data chip stream to generate an uplink signal, which is transmitted via an antenna 924. On the receive path, downlink signals transmitted by base stations 110 in WWAN 100 and/or access points 112 in WLAN 102 are received by antenna 924 and provided to a receiver unit (RCVR) 926. Receiver unit 926 conditions (e.g., filters, amplifies, and frequency downconverts) the received signal and further digitizes the conditioned signal to obtain data samples. A demodulator (DEMOD) 916 processes (e.g., descrambles, despreads, channelizes, and demodulates) the data samples to obtain symbols. A decoder 918 further processes (e.g., deinterleaves and decodes) the symbols to obtain decoded data. Encoder 912, modulator 914, demodulator 916, and decoder 918 may be implemented by a modem processor 910. These units perform processing in accordance with the technology used by the WWAN or WLAN system with which wireless device 120x communicates.

A processor/controller 930 directs the operation of various units within wireless device 120x. Processor/controller 930 may implement process 800 in FIG. 8 for system selection and acquisition. A memory unit 932 stores program codes and data used by processor/controller 930 and other units. Memory unit 932 may store a PRL for WWAN and WLAN systems, a profile table for WLAN systems, and/or a network identifier (NI) table for WLAN systems and possibly other systems. The PRL, profile table, and/or NI table may be used for system selection and acquisition as described above. A removable module 934 includes a non-volatile memory unit that can store the PRL, the profile table, and/or the NI table. Removable module 934 may be a Removable User Identity Module (R-UIM) (used for cdma2000), a Subscriber Identity Module (SIM) (used for W-CDMA and GSM), a Universal Subscriber Identity Module (USIM) (also used for W-CDMA and GSM), and so on.

A PRL server 150 supports over-the-air programming of PRL using SMS messages. PRL server 150 may form a PRL with records for WWAN and WLAN systems, generates a data block for the PRL, and forwards the data block to a Short Message Service (SMS) service center 140. Center 140 encapsulates the data block within one or more SMS messages. MSC 130 receives the SMS messages and forwards the messages to base station 110x, which transmits the messages over the air to the wireless devices within its coverage area. An Over-the-Air Service Provisioning Function (OTAF) (not shown in FIG. 9) also supports over-the-air programming of PRL. The OTAF may form a PRL with records for WWAN and WLAN systems, generate a data block for the PRL, and encapsulate the data block in one or more messages. MSC 130 receives the message(s) from the OTAF and forwards the message(s) to base station 110x for transmission to the wireless devices.

At wireless device 120x, processor/controller 930 may receive a decoded data block with the PRL sent by PRL center 150 or the OTAF and may store the PRL in memory unit 932 and/or removable module 934. Processor/controller 930 may also receive system and/or security-related information from a user for WLAN systems and may store the information in memory unit 932 and/or removable module 934

The techniques described herein may be implemented by various means. For example, these techniques may be implemented in hardware, software, or a combination thereof. For a hardware implementation, the processing units used to perform system selection and acquisition may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 932 in FIG. 9) and executed by a processor (e.g., processor 930). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a memory unit operative to store a preferred roaming list (PRL) for at least one wireless wide area network (WWAN) system and at least one wireless local area network (WLAN) system;
    wherein the PRL comprises
        an acquisition record for each WLAN system, and wherein each acquisition record indicates at least a band class for the respective WLAN system; and
        a profile identifier pointing to a profile table corresponding to the at least one WLAN system, the profile table carrying at least information used for authentication and encryption for the at least one WLAN system;
    wherein the PRL and the profile table comprise one set of a plurality of different sets of PRLs and profile tables selected depending on a service plan; and
    a processor operative to use the PRL for system selection and acquisition.

2. The apparatus of claim 1, wherein the processor is operative to acquire at least one system based on acquisition records in the PRL.

3. The apparatus of claim 1, wherein the processor is operative to select a system from among the at least one WWAN system and the at least one WLAN system based on system records in the PRL.

4. The apparatus of claim 1, wherein the processor is operative to obtain, from the PRL, system records for WWAN and WLAN systems in a geographic area, to determine preferences for the WWAN and WLAN systems in the geographic area based on the system records, and to select at least one system among the WWAN and WLAN systems in the geographic area based on the preferences.

5. The apparatus of claim 1, wherein the processor is operative to acquire a WWAN system initially and to acquire a WLAN system next, if available, based on the acquired WWAN system.

6. The apparatus of claim 1, wherein the processor is operative to attempt acquisition of a WWAN system first and to attempt acquisition of a WLAN system if no WWAN systems are acquired.

7. The apparatus of claim 1, wherein the memory unit is operative to store the profile table for the at least one WLAN system.

8. The apparatus of claim 7, wherein the processor is operative to obtain from the profile table a profile record for a selected WLAN system and to perform authentication with the selected WLAN system based on the profile record.

9. The apparatus of claim 8, wherein the processor is operative to determine an authentication scheme to use for the selected WLAN system based on the profile record, to obtain security-related information from the profile record, and to perform authentication with the selected WLAN system in accordance with the authentication scheme and further based on the security-related information.

10. The apparatus of claim 7, wherein the processor is operative to obtain from the profile table a profile record for a selected WLAN system and to perform encryption for the selected WLAN system based on the profile record.

11. The apparatus of claim 10, wherein the processor is operative to determine an encryption scheme to use for the selected WLAN system based on the profile record, to obtain security-related information from the profile record, and to perform encryption for the selected WLAN system in accordance with the encryption scheme and further based on the security-related information.

12. The apparatus of claim 1, wherein the PRL comprises one system record for each WLAN system, and wherein each system record indicates a service set identifier (SSID), the respective acquisition record, a profile record, a preference, a prefix, or a combination thereof for an associated WLAN system.

13. The apparatus of claim 1, wherein each acquisition record further indicates a technology, a channel, or a combination thereof for the respective WLAN system.

14. The apparatus of claim 7, wherein the profile table comprises one profile record for each WLAN system, and wherein each profile record indicates an authentication scheme, an encryption scheme, a security key, a password, an user identifier, or a combination thereof for an associated WLAN system.

15. The apparatus of claim 1, wherein the memory unit is operative to store the profile table further comprised of at least one profile record, and wherein each profile record stores particular types of information determined by a profile type for the profile record.

16. The apparatus of claim 15, wherein the at least one WLAN system is assigned a predetermined profile type value.

17. The apparatus of claim 1, wherein the PRL is backward compatible with TIA-683-C standard.

18. A method of performing system selection and acquisition, comprising:
   obtaining a preferred roaming list (PRL) for at least one wireless wide area network (WWAN) system and at least one wireless local area network (WLAN) system;
   wherein the PRL comprises
      an acquisition record for each WLAN system, and wherein each acquisition record indicates at least a band class for the respective WLAN system; and
      a profile identifier pointing to a profile table corresponding to the at least one WLAN system, the profile table carrying at least information used for authentication and encryption for the at least one WLAN system;
   wherein the PRL and the profile table comprise one set of a plurality of different sets of PRLs and profile tables selected depending on a service plan; and
   using the PRL for system selection and acquisition.

19. The method of claim 18, wherein the using the PRL for system selection and acquisition comprises
   obtaining, from the PRL, at least one acquisition record,
   acquiring at least one system based on the at least one acquisition record,
   obtaining, from the PRL, system records for the at least one acquired system and WWAN and WLAN systems in a same geographic area as the at least one acquired system, and
   selecting a system in the geographic area based on the system records.

20. The method of claim 18, further comprising:
   obtaining a profile record for a selected WLAN system;
   determining an authentication scheme to use for the selected WLAN system based on the profile record;
   obtaining security-related information for the selected WLAN system from the profile record; and
   performing authentication with the selected WLAN system in accordance with the authentication scheme and further based on the security-related information.

21. The method of claim 18, further comprising:
   obtaining a profile record for a selected WLALN system;
   determining an encryption scheme to use for the selected WLAN system based on the profile record;
   obtaining security-related information for the selected WLALN system from the profile record; and
   performing encryption for the selected WLAN system in accordance with the encryption scheme and further based on the security-related information.

22. An apparatus comprising:
   means for obtaining a preferred roaming list (PRL) for at least one wireless wide area network (WWAN) system and at least one wireless local area network (WLAN) system;
   wherein the PRL comprises
      an acquisition record for each WLAN system, and wherein each acquisition record indicates at least a band class for the respective WLAN system; and
      a profile identifier pointing to a profile table corresponding to the at least one WLAN system, the profile table carrying at least information used for authentication and encryption for the at least one WLAN system;
   wherein the PRL and the profile table comprise one set of a plurality of different sets of PRLs and profile tables selected depending on a service plan; and
   means for using the PRL for system selection and acquisition.

23. The apparatus of claim 22, wherein the means for using the PRL for system selection and acquisition comprises
   means for obtaining, from the PRL, at least one acquisition record,
   means for acquiring at least one system based on the at least one acquisition record,
   means for obtaining, from the PRL, system records for the at least one acquired system and WWAN and WLAN systems in a same geographic area as the at least one acquired system, and
   means for selecting a system in the geographic area based on the system records.

24. The apparatus of claim 22, further comprising:
   means for obtaining a profile record for a selected WLAN system;
   means for determining an authentication scheme to use for the selected WLAN system based on the profile record;
   means for obtaining security-related information for the selected WLAN system from the profile record; and
   means for performing authentication with the selected WLAN system in accordance with the authentication scheme and further based on the security-related information.

25. The apparatus of claim 22, further comprising:
   means for obtaining a profile record for a selected WLAN system;
   means for determining an encryption scheme to use for the selected WLAN system based on the profile record;
   means for obtaining security-related information for the selected WLAN system from the profile record; and
   means for performing encryption for the selected WLAN system in accordance with the encryption scheme and further based on the security-related information.

26. A processor-readable media storing instructions executable by a processor operable in a wireless device to:
   obtain a preferred roaming list (PRL) for at least one wireless wide area network (WWAN) system and at least one wireless local area network (WLAN) system;
   wherein the PRL comprises
      an acquisition record for each WLAN system, and wherein each acquisition record indicates at least a band class for the respective WLAN system; and a profile identifier pointing to a profile table corresponding to the at least one WLAN system, the profile table carrying at least information used for authentication and encryption for the at least one WLAN system;

wherein the PRL and the profile table comprise one set of a plurality of different sets of PRLs and profile tables selected depending on a service plan; and use the PRL for system selection and acquisition.

27. The processor-readable media of claim 26 further comprising processor-executable instructions operable to:

obtain, from the PRL, at least one acquisition record;

direct acquisition of at least one system based on the at least one acquisition record;

obtain, from the PRL, system records for the at least one acquired system and WWAN and WLAN systems in a same geographic area as the at least one acquired system; and select a system in the geographic area based on the system records.

28. A wireless device comprising:

a memory unit operative to store at least one file containing system and security-related information for at least one wireless local area network (WLAN) system;

wherein the at least one file comprises at least one system record for the at least one WLAN system, and wherein each system record indicates at least a band class for the respective WLAN system; and at least one profile table containing at least information used for authentication and encryption for the at least one WLAN system;

wherein the system record and the profile table comprise one set of a plurality of different sets of system records and profile tables selected depending on a service plan; and wherein the at least one file is used by the wireless device for system selection and acquisition for the at least one WLAN system; and a processor operative to use the at least one file to acquire and select a WLAN system.

29. The wireless device of claim 28, wherein the processor is operative to obtain from the at least one file at least one system record for the at least one WLAN system, to select one of the at least one WLAN system based on the at least one system record, and to acquire a selected WLAN system based on an associated system record.

30. The wireless device of claim 28, wherein the processor is operative to obtain from the at least one file a profile record for a selected WLAN system, to determine an authentication scheme based on the profile record, and to perform authentication with the selected WLAN system in accordance with the authentication scheme, if any, determined for the selected WLAN system.

31. The wireless device of claim 28, wherein the processor is operative to obtain from the at least one file a profile record for a selected WLAN system, to determine an encryption scheme based on the profile record, and to perform encryption for the selected WLAN system in accordance with the encryption scheme, if any, determined for the selected WLAN system.

32. The wireless device of claim 28 wherein each system record further indicates a technology, a channel, a mode, a service set identifier (SSID), or a combination thereof for the respective WLAN system.

33. The wireless device of claim 28, wherein the at least one file comprises at least one profile record for the at least one WLAN system, and wherein each profile record indicates an authentication scheme, an encryption scheme, a security key, a password, an user identifier, or a combination thereof for an associated WLAN system.

34. The wireless device of claim 28, wherein the at least one file comprises at least one other system record for at least one other system utilizing a technology different than the technology for the at least one WLAN system.

35. The wireless device of claim 28, wherein the memory unit is operative to store a single file containing both the system and security-related information for the at least one wireless WLAN system.

36. The wireless device of claim 28, wherein the memory unit is operative to store a first file containing the system information for the at least one wireless WLAN system and a second file containing the security-related information for the at least one wireless WLAN system.

37. A method of performing system selection and acquisition, comprising:

obtaining at least one file containing system and security-related information for at least one wireless local area network (WLAN) system;

wherein the at least one file comprises at least one system record for the at least one WLAN system, and wherein each system record indicates a band class for the respective WLAN system; and at least one profile table containing at least information used for authentication and encryption for the at least one WLAN system;

wherein the system record and the profile table comprise one set of a plurality of different sets of system records and profile tables selected depending on a service plan;

wherein the at least one file is used by a wireless device for system selection and acquisition for the at least one WLAN system; and using the at least one file to acquire and select a WLAN system.

38. The method of claim 37, wherein the using the at least one file for system selection and acquisition comprises obtaining from the at least one file at least one system record for the at least one WLAN system, selecting one of the at least one WLAN system based on the at least one system record, and acquiring a selected WLAN system based on an associated system record.

39. The method of claim 37, further comprising:

obtaining from the at least one file a profile record for a selected WLAN system;

determining an authentication scheme based on the profile record;

performing authentication with the selected WLAN system in accordance with the authentication scheme, if any, determined for the selected WLAN system;

determining an encryption scheme based on the profile record; and performing encryption for the selected WLAN system in accordance with the encryption scheme, if any, determined for the selected WLAN system.

40. An apparatus comprising:

means for obtaining at least one file containing system and security-related information for at least one wireless local area network (WLAN) system, wherein the at least one file comprises at least one system record for the at least one WLAN system, and wherein each system record indicates a band class for the respective WLAN system; and at least one profile table containing at least information used for authentication and encryption for the at least one WLAN system;

wherein the system record and the profile table comprise one set of a plurality of different sets of system records and profile tables selected depending on a service plan;

wherein the at least one file is used by a wireless device for system selection and acquisition for the at least one WLAN system; and means for using the at least one file to acquire and select a WLAN system.

41. The apparatus of claim 40, wherein the means for using the at least one file for system selection and acquisition comprises means for obtaining from the at least one file at least one system record for the at least one WLAN system, means for selecting one of the at least one WLAN system based on the at least one system record, and means for acquiring a selected WLAN system based on an associated system record.

42. The apparatus of claim 40, further comprising:

means for obtaining from the at least one file a profile record for a selected WLAN system;

means for determining an authentication scheme based on the profile record;

means for performing authentication with the selected WLAN system in accordance with the authentication scheme, if any, determined for the selected WLAN system;

means for determining an encryption scheme based on the profile record; and means for performing encryption for the selected WLAN system in accordance with the encryption scheme, if any, determined for the selected WLAN system.

* * * * *